(12) United States Patent
Ehrenberg (10) Patent No.: US 9,887,042 B1
(45) Date of Patent: Feb. 6, 2018

(54) DIELECTRIC MATERIAL, CAPACITOR AND METHOD

(71) Applicant: Ehrenberg Industries Corporation, Trinity, FL (US)

(72) Inventor: Scott Ehrenberg, Trinity, FL (US)

(73) Assignee: Ehrenberg Industries Corporation, Trinity, FL (US)

( * ) Notice: Subject to any disclaimer, the term of this patent is extended or adjusted under 35 U.S.C. 154(b) by 682 days.

(21) Appl. No.: 14/226,160

(22) Filed: Mar. 26, 2014

Related U.S. Application Data (60) Provisional application No. 61/805,515, filed on Mar. 26, 2013.

(51) Int. Cl.
| | |
|---|---|
| *H01J 7/00* | (2006.01) |
| *H01G 9/07* | (2006.01) |
| *H02J 7/00* | (2006.01) |
| *H01G 9/00* | (2006.01) |

(52) U.S. Cl.
CPC ............ *H01G 9/07* (2013.01); *H01G 9/0032* (2013.01); *H02J 7/00* (2013.01)

(58) Field of Classification Search
CPC .............................. H01G 9/07; H01G 9/0032
USPC ......................................................... 320/166
See application file for complete search history.

(56) References Cited

U.S. PATENT DOCUMENTS

| | | | | |
|---|---|---|---|---|
| 6,154,160 | A * | 11/2000 | Meyer et al. | 341/139 |
| 6,605,236 | B1 * | 8/2003 | Smith | C08F 293/005 252/500 |
| 7,608,356 | B2 * | 10/2009 | Risen et al. | 429/492 |
| 7,772,431 | B1 * | 8/2010 | Newkome | 564/153 |
| 2003/0070548 | A1 * | 4/2003 | Clausen | 96/4 |
| 2005/0181252 | A1 * | 8/2005 | Risen et al. | 429/30 |
| 2006/0083694 | A1 * | 4/2006 | Kodas et al. | 424/46 |
| 2007/0178163 | A1 * | 8/2007 | Kodas et al. | 424/489 |
| 2009/0146202 | A1 * | 6/2009 | Leong et al. | 257/315 |
| 2011/0060103 | A1 * | 3/2011 | Marchand | C08F 297/08 525/53 |
| 2014/0255812 | A1 * | 9/2014 | Fischel | 429/451 |
| 2014/0346046 | A1 * | 11/2014 | Andelman | 204/554 |

(Continued)

FOREIGN PATENT DOCUMENTS

| | | |
|---|---|---|
| CA | 2440961 A1 | 9/2002 |
| CN | 101022879 A | 8/2007 |
| CN | 101641146 A | 2/2010 |

(Continued)

OTHER PUBLICATIONS

Bronich, Tatiana K et al., Polymer Micelle With Cross-Linked Core, J.Am. Chem. Soc., 2005, 127 (23), pp. 8236-8237, 2 pages.

(Continued)

*Primary Examiner* — Suchin Parihar
(74) *Attorney, Agent, or Firm* — Christopher Paradies; Paradies Law P.A.

(57) ABSTRACT

A dielectric comprises a matrix and a plurality of isolated, ionomeric domains, defined as micelles herein, distributed within the matrix. A capacitor is comprised of the dielectric and two electrodes. A method incorporates the capacitor into a circuit for an energy storage device, especially for applications requiring both high energy density and high power density. The method includes both rapid charging and rapid discharging of the energy storage device.

20 Claims, 10 Drawing Sheets

(56) References Cited

U.S. PATENT DOCUMENTS

2015/0155592 A1* 6/2015 Pratt .................. H01M 10/052
                                                     429/310

FOREIGN PATENT DOCUMENTS

| CN | 101730679 A | 6/2010 |
|---|---|---|
| CN | 102804303 A | 11/2012 |
| DE | 69519855 T2 | 8/2001 |
| DE | 10295503 T5 | 9/2005 |
| EP | 763070 B1 | 1/2001 |
| EP | 1664130 A1 | 6/2006 |
| EP | 2109495 A1 | 10/2009 |
| EP | 2109495 A4 | 9/2011 |
| GB | 2389063 A | 12/2003 |
| GB | 2389701 A | 12/2003 |
| WO | 0210071 A2 | 2/2002 |
| WO | 0210071 A3 | 2/2002 |
| WO | 02072242 A1 | 9/2002 |
| WO | 02080295 A2 | 10/2002 |
| WO | 02080295 A3 | 8/2004 |
| WO | 2005030812 A1 | 4/2005 |
| WO | 2008039779 A2 | 4/2008 |
| WO | 2008039779 A3 | 7/2008 |
| WO | 2008089484 A1 | 7/2008 |
| WO | 2008141179 A1 | 11/2008 |
| WO | 2011085186 A2 | 7/2011 |
| WO | 2011085197 A1 | 7/2011 |
| WO | 2011685186 A1 | 7/2011 |
| WO | 2011086186 A3 | 11/2011 |

OTHER PUBLICATIONS

Bates, Frank S. et al., Multiblock Polymers: Panaceaor Pandora's Box?, Science 336, Apr. 27, 2012, 8 pages.

Choi, Jae-Hong et al., Structure-Property relationship in Sulfonated Pentablock Copolymers, Journal of Membrane Science394-395 (2012) 169-174, 6 pages.

Nakabayashi, Kazuhiro, Highly Sulfonated Multiblock Copoly (ether sulfone)s for Fuel Cell Membranes, 2 pages.

* cited by examiner

Methylation

Amination

FIG. 12 sulfonated SEBS

FIG. 13 sulfonated poly(arylene ether sulfone)

FIG. 14 sulfonated poly(arylene ether ether ketone)

FIG. 15
sulfonated poly(phenylene)

FIG. 16
phosphoric acid-doped poly(benzimidazole)

US 9,887,042 B1

DIELECTRIC MATERIAL, CAPACITOR AND METHOD

CROSS RELATED APPLICATIONS

This application claims priority to U.S. Provisional Application No. 61/805,515, filed Mar. 26, 2013, and the specification, claims and drawings are hereby incorporated in their entirety by reference.

FIELD OF THE INVENTION

The field relates to dielectric materials used in capacitors and capacitors used in energy storage.

BACKGROUND

Batteries, such as electrochemical batteries are known devices for storing energy for high energy density applications, greater than 10 Watt hours per kilogram (Wh/kg), for example.

Capacitors, such as supercapacitors and ultracapacitors, are used for storing energy for applications having energy density requirements less than 10 Watt hours per kilogram (Wh/kg), particularly if a power density greater than 1000 Watts per kilogram (W/kg) is required.

Batteries are not capable of achieving power densities of supercapacitors. Supercapacitors are not capable of achieving energy densities of batteries.

The technologies for packaging and providing electrical contacts on batteries and capacitors, including supercapacitors and ultracapacitors are well known. However, limitations in materials available prevent known storage devices from having both high energy densities and high power densities at the same time.

U.S. Pat. Publ. No. 2010/0008021 A1, published Jan. 14, 2010, discloses a porous carbon electrode with conductive polymer, referred to as a polyaniline electrode, useful in fabricating supercapacitors. This reference includes a background on various types of supercapacitors and the limitations of the materials used in supercapacitors.

SUMMARY

Figure 1:
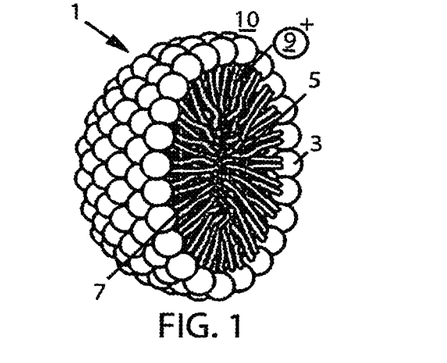
FIG. 1 schematically illustrates a partial cutaway view of an example of a micelle.

A dielectric comprises a plurality of ionomeric polymer micelles, isolated ionomeric domains of agglomerated atoms or molecules. For example, micelles may be formed by "oil in water" or "water in oil" processes that are driven by surface energy thermodynamics or other thermodynamic processes. For example, a schematic example of a partial cut-away view of a micelle is illustrated in FIG. 1. Although the "heads" may be located either at the exterior or the center of the micelle. FIG. 1 illustrates an example where the heads are located at the exterior and the tails are located in the interior of a micelle. The process of producing micelles is known as micellization or micellisation. Lipids and polymers may be engineered to create micelles under certain conditions in liquids. The parameters selected are the comparative surface energy between the surrounding matrix and the head and tail of a lipid or polymer chain.

For example, the head may be one end of a polymer chain, and the tail may be an opposite end. Alternatively, the head may be a central block of a multi-block polymer and a pair of tails may extend from the head. In one example, a plurality of ionomeric polymer micelles is formed by selecting block co-polymers that have hydrophobic and hydrophilic moieties, such that micellization occurs when the ionomeric polymers are added to a dielectric fluid and are held within a particular temperature range. For example, a polymer may be functionalized to form a micelle by adding a comparatively hydrophilic functional group in one block of a polymer strand, such that a comparatively hydrophobic tail or tails extend from the hydrophilic head. Alternatively, a hydrophobic head may be selected with hydrophilic tail or tails extending from the hydrophobic head. Thus, a micelle or reverse micelle may be formed by micellization. In one example, the micellization and assembly of the micelles within a matrix is a form of self assembly, such that micelles are distributed throughout a dielectric matrix, as isolated micelles. For example, an electric field may be applied between two conductive plates by applying an electrical potential across the plates during or after micellization. By applying the electric field, ions disposed within the micelles may be segregated. to the core of each micelle, forming ionomeric polymer micelles distributed throughout the matrix.

In one example, the matrix is a dielectric oil, such as mineral oil. and the ionomeric polymer micelles form around water dispersed throughout the dielectric oil. For example, one end of a block co-polymer may be hydrophobic while an opposite end may be hydrophilic, resulting in a self assembly of the polymer when added to an emulsified mineral oil-water mixture. If the matrix is mineral oil and the water is dispersed as fine drops throughout the oil, such as by vigorous agitation and/or surfactants, then adding the block copolymers results in self assembly of the polymers as micelles isolating the water droplets from the mineral oil, reducing surface tension (lower surface energy), overcoming the resulting reduction in entropy of the self assembly process. Herein, micelles are defined as any agglomerated, isolated and ionically distinct domains formed within a matrix, such as a polymer matrix. For example, ionized micelles may be formed by solvating, or partially dissolving, block copolymers in a solvent, such as diblock, triblock or higher multiblock copolymers. For example, such copolymers may have certain regions functionalized, such as by aminization or sulfination, forming isolated, positively or negatively charged regions, agglomerated within a polymer matrix.

Preferably, the dielectric material is comprised of a multiblock, copolymer comprising isolated, ionomeric micellular domains within a polymer matrix, such that the dielectric material has surprising and unexpected properties, including a surprisingly large dielectric and breakdown voltage, such that a capacitor utilizing a layer of the dielectric material is capable of achieving energy densities as good as or better than batteries and power densities as good as or greater than conventional capacitors.

In one example, a dielectric comprises a dielectric micellular matrix comprised of a plurality of ionomeric micelles distributed within a matrix, such that each of the plurality of micelles comprises an electrically isolated, ionomeric domain isolated from the remainder of the plurality of micelles. The matrix may comprise a polymer, such as a block co-polymer, for example. The block co-polymer may include at least one styrene block, which may be at least partially sulfonated. The block co-polymer may comprise at least one non-ionic block, also. For example, a block co-polymer may comprise a multi-block polymer comprising at least three blocks, each of the three blocks comprising a different polymer, and the at least three blocks comprises at least one ionic block and at least one non-ionic block. At least one of the at least three blocks may be a non-ionic block engineered to impart at least a range of miscibility of the polymer in a solvent or may be selected to bind at least two other blocks together.

One example of a capacitor comprises an anode, a cathode, and a dielectric micellular matrix as a layer physically separating the anode from the cathode. For example, the anode and/or the cathode may be made of an aluminum or other electrically conductive material. The layer may have a thickness of 35 microns or more preferably 70 microns. In one example, polymer sheets, such as a poly(ethylene terephthalate) (PET) films, encapsulate at least a portion of the anode and cathode, sealing the dielectric layer within the capacitor. The first sheet and the second sheet may adhere one to the other or may adhere to spacers disposed between the polymer sheets. For example, the anode may be electrically isolated from the cathode by extending the dielectric layer over the entire surface of the cathode, except for the electrical contact area. Alternatively, only one surface of each electrode may be covered by a dielectric layer, and one of the electrodes may be made stamped, machined or otherwise formed to be smaller, such that the dielectric layer extends beyond the perimeter of the smaller electrode.

In one example, a method for manufacturing a capacitor comprises dissolving a multi-block co-polymer in a solvent to form a solution, disposing the solution as a layer on a surface of one or both of an anode and a cathode, removing the solvent from the solution, leaving the layer on the surface of one or both of the anode and the cathode, positioning the cathode on the anode, such that the layer is disposed between the cathode and the anode, and a portion of the layer extends beyond the outer perimeter of either of the cathode or the anode, and applying pressure such that the anode and the cathode make electrical contact with the layer. For example, the layer is selected such that a plurality of ionomeric polymer micelles are distributed within a matrix, such that each of the plurality of micelles comprises an isolated, ionic domain substantially isolated from other micelles. The ionomeric polymer micelles may be formed and distributed in a self-assembly process, for example. In one example, a method of using such a capacitor may comprise connecting the capacitor to charging electronics and discharging electronics, charging the capacitor to at least 100 volts and at least one Coulomb, at least partially discharging the capacitor, and repeating the steps of charging and discharging at least 100 times. For example, a storage device may be made by stacking a plurality of such capacitors, which may be electrically coupled in parallel and/or in series.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

The detailed description provides examples illustrating the claimed inventions, which should not be limited by the particular examples. Variations and combinations of the features illustrated in the examples and in the summary may be included within the scope of the invention, which should be Limited solely by the claims that eventually issue. As illustrated in FIG. 1, for example, a micelle 1 has an interior ionic region 7 surrounded by a dielectric exterior region 10, which may be comprised of the dielectric matrix, for example. Ions 9 are capable of migrating from the exterior region 10 to the interior region 7, for example.

Figure 3:
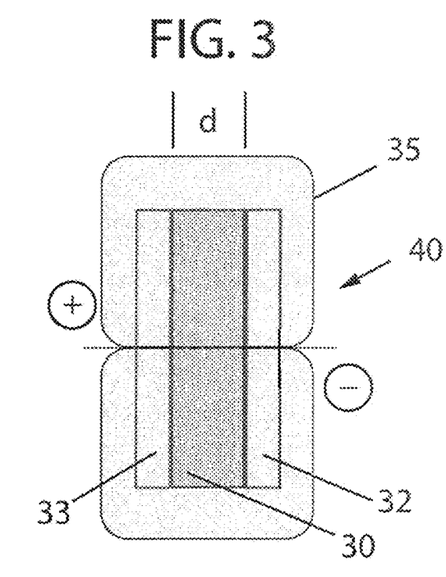
FIG. 3 illustrates one example of a capacitor comprising ionmeric micelles.

As illustrated in the example of FIG. 3, a dielectric 30 comprises a plurality of ionomeric polymer micelles 1, such as illustrated, schematically, in the example of FIG. 1. The micelles 1 may be distributed within matrix 10, such that each micelle 1 of the plurality of micelles 1 comprises an ionic region 7 segregated from the remainder of the micelle 1. For example, the dielectric matrix 10 is illustrated in contact with the head 3 of a block copolymer (which may extend beyond the head but is removed for clarity). The co-polymer may be a multi-block co-polymer, for example. A multi-block polymer or co-polymer is defined herein as having a plurality of blocks in a block co-polymer arrangement. Each block of a multiblock co-polymer may be functionalized for a different purpose within the block co-polymer, for example.

In one example, a dielectric 10 is an oil, such as an inorganic oil or an organic oil. One example is mineral oil. The plurality of micelles may be miscible in the oil. A block co-polymer may be comprised of an ionic block and a non-ionic block, for example. Alternatively, the plurality of micelles may comprise a multi-block polymer comprised of at least one ionic block and at least one non-ionic block. In this way, a dielectric 10 may be formed of isolated, ionomeric domains and a non-ionic matrix. For example, the multi-block polymer comprises at least three blocks, and at least one of the blocks is a non-ionic block selected such that each of the plurality of micelles self-assemble when exposed to an electromagnetic field or subjected to a particular range of temperature and pressure, allowing the polymer chains to reorganize within a polymer layer. At least one of the blocks is a non-ionic block functionally engineered (i.e. functionalized) to impart miscibility of the plurality of micelles in the dielectric matrix, for example. For example, at least one of the blocks is a non-ionic block selected to bind at least two other blocks together, such as by covalent binding. At least one of the blocks may be a non-ionic block selected to adjust the size of the multi-block polymer to a desired structure, such as length, width or form, for example. For example, the multi-block polymer comprises a di-block polymer and a multi-block polymer, having at least three blocks, and the plurality of micelles self assemble when mixed in the dielectric matrix and subjected to an electromagnetic field or when subjected to a particular range of temperature and pressure, such as by raising the temperature and pressure near or to a glass transition temperature, such that polymer strands may rearrange into agglomerated, isolated ionomeric micelles, which serve as isolated ionomeric domains within a matrix. For example, an electric potential may be applied across a thin film of the dielectric in order to distribute the micelles throughout the matrix.

In one example, a dielectric as described herein is used to produce a capacitor 40 comprising two electrically conductive electrodes (i.e. an anode and a cathode) separated by a dielectric. The electrodes may be conductive plates, films and the like as known in the art. The two electrically conductive electrodes and the dielectric are coupled together by a sealing system 35, such as the example illustrated in on the upper portion of the capacitor 40 in the example of FIG. 3. In one example, the sealing system comprises a dielectric compression fitting. The compression fitting may be separated from any conductive portion of the two electrically conductive electrodes by a dielectric material, for example.

Figure 4:
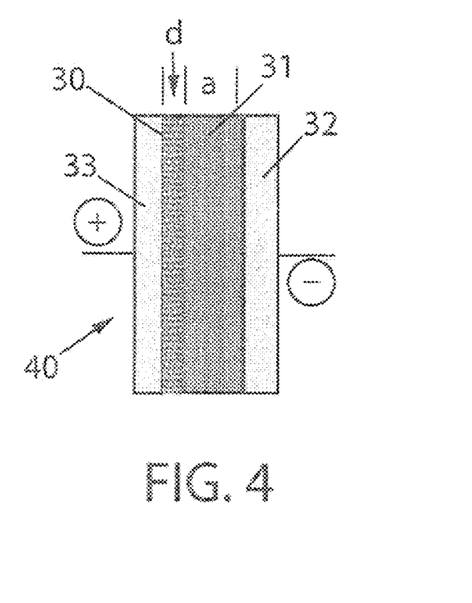
FIG. 4 illustrates another example of a capacitor comprising ionomeric micelles.

In one example, a method comprises preparing a mixture of multi-block polymers in a dielectric matrix, such as by a micellization process via functionalization of block co-polymers, and imposing an electromagnetic field on the mixture, such that the multi-block polymers self assemble into isolated, electrically polarizable ionic micelles. Ionic micelles may comprise a structure isolating ions in electric fields having an operating voltage of at least 10 volts, for example, more preferably 20 volts and even more preferably 100 volts. A capacitor incorporating the dielectric, such as illustrated in FIGS. 3 and 4, may comprise a power density greater than 1000 W/kg, and an energy density of at least 10 Wh/kg. In another example, the capacitor comprises an energy density of at least 20 Wh/kg, more preferably at least 100 Wh/kg, even more preferably up to 1000 Wh/kg or greater, making this the only known capacitor capable of having energy densities comparable to batteries and even fuel cells. In addition, the capacitor may have a high power density at the same time, achieving power densities superior to conventional capacitors in some examples.

Figure 7:
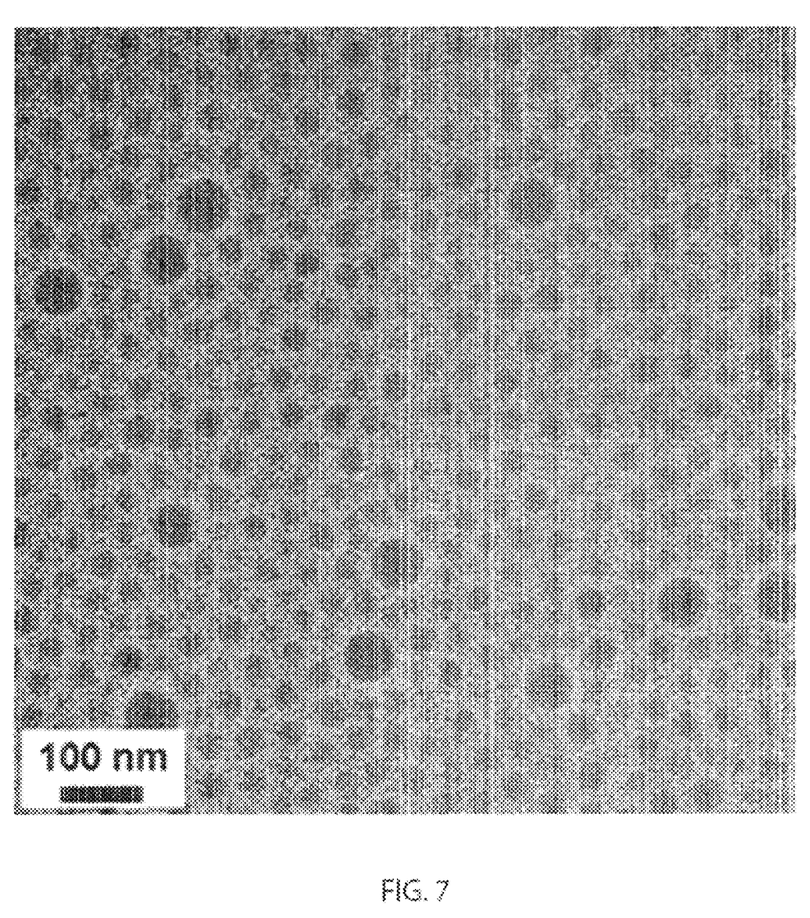
FIG. 7 illustrates an SEM micrograph of sulfonated, polymer micelles in a polymer matrix.

Herein, a dielectric micellular matrix means a matrix that isolates distinct, ionomeric domains, such as micelles formed by agglomeration of ionomeric portions of a polymer within an isolated region within a matrix. For example, FIG. 7 illustrates an SEM photomicrograph of a multiblock copolymer exhibiting a micellular matrix; however, the particular micellular matrix shown has been made ionically neutral by the addition of metal ions into the matrix. Each of the domains or a significant fraction of the domains of a dielectric micellular matrix are isolated one from the other, such that the ionomeric domains and the matrix, together, comprise a dielectric material. The dielectric material may be a layer in a capacitor capable of storing energy. The matrix, itself, need not, necessarily, be a very good dielectric. Instead, the combination of the matrix and a large number of isolated, micellular and ionomeric domains combine to provide surprising and unexpected dielectric properties.

In one example, the dielectric matrix and the plurality of micelles form a slurry or a gel, such as by crosslinking polymers within the dielectric matrix. For example, the dielectric matrix may be a polymer matrix, a copolymer matrix, a dielectric oil, such as a mineral oil, or a combination of these. In one example, a block copolymer may be comprised of one or more functionalized blocks that are capable of being crosslinked. For example, crosslinking may be stimulated by curing the dielectric, using heat or ultraviolet light, for example. In one example, the dielectric matrix and the plurality of micelles form a gel. In another example, the dielectric comprises an aerogel. For example, the aerogel may be prepared by a solvation process. For example, the aerogel may be filled with a dielectric oil, such as mineral oil. In one example, the dielectric comprises a porous substrate infused with the dielectric oil and a plurality of ionomeric micelles are dispersed throughout the matrix and remain substantially isolated from each other, such that excess charge on one electrode on one side of a dielectric film are prevented from transporting to an opposite electrode on the opposite side of the dielectric film.

Figure 2:
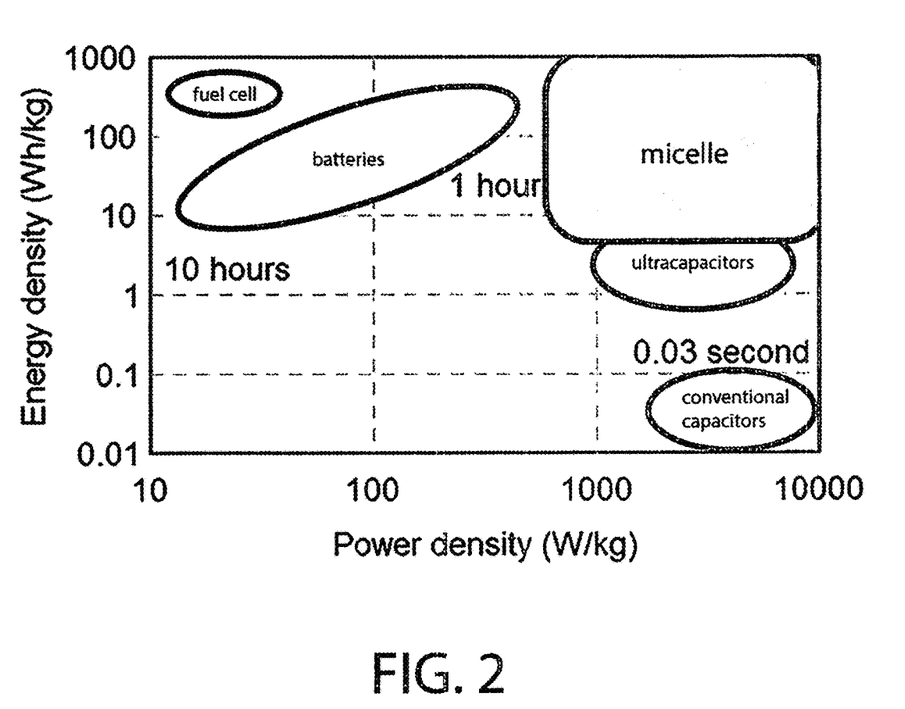
FIG. 2 schematically compares an example of a capacitor comprising ionomeric micelles, region shaded and labelled micelle, and other energy storage devices.

For example, it is thought, without being limiting in any way, that a dielectric may comprise a resistance of at least $10^9$ ohm-cm, preferably at least $10^{12}$ ohm-cm, such that the dielectric may be used in a capacitor that stores high energy densities, with low losses over time, like a battery, but also high power densities, like an ultracapacitor, as illustrated in FIG. 2, for example. In one example, a capacitor utilizing the dielectric material operates at 10 volts or greater and may have a very high breakdown voltage, such as breakdown voltages of at least 20 volts, more preferably, 200 volts, even more preferably 1,000 volts, more preferably 2000 volts and even more preferably at least 30,000 volts. A dielectric may be polarizable under an applied electromagnetic field and may be unpolarized when the electric field is removed.

A method of using a dielectric comprises applying and removing an electromagnetic field in a cycle, such that the dielectric is polarized and unpolarized during the cycle, and repeating the cycle at least one hundred times. Surprisingly, the capacitor may exhibit little hysterysis during cycling.

In one example a micelle dielectric has a dielectric constant of at least 10,000, more preferably at least $10^6$ and even more preferably at least $10^9$. The plurality of micelles may comprise a total ionic content exceeding the charge on the two conducting electrodes. Surprisingly, nano-micelles, having dimensions less than 100 nanometers, may maintain substantial ionic content. In one example, a ratio of moles of the total ionic content in the dielectric to the moles of charge on the two conducting electrodes is greater than 10. More preferably, the process creates a sufficient number of micelles dispersed within the dielectric such that the ratio is greater than 1000. An ionic liquid selected from the group of ionic liquids consisting of a liquid including ionic salt and a saturated water solvated ionic solution may be used as a source of ions for the micelles. The ionic liquid may be comprised of ions selected from the group of ions consisting of iron (Fe+), iodine (I−), lithium (Li+) sodium (Na+) and chlorine (Cl−). In one example, the ionic liquid is a saturated water solvated ionic solution. For example, ions are selected from iron or iodide, which are large, heavy ions, easily trapped within the confines of the micelle. For example, a functionalized block may be capable of binding ions within the micelles.

In one example, cross-linking of polymer within the dielectric matrix increases the strength and immobilizes the micelles. Conductive electrodes and dielectric form a plurality of cells, isolated from each other, and the plurality of cells are stacked one on top of another, forming a capacitor stack, which may be packaged in a protective housing, for example. The stack may comprise at least two cells electrically connected in parallel, for example. Alternatively or in addition to electrical connection in parallel, some or all of the capacitors may be coupled in series, electrically.

In one example, a protective housing comprises a pouch, which may be sealed around the conductive electrodes under vacuum, such that conductive electrodes are sealed from air. for example. Contacts, as illustrated schematically in FIGS. 3 and 4, may extend from the electrodes 32, 33 through the pouch 35, and the pouch forms seals around the contacts, for example. In the example of FIG. 4, a layer of dielectric 30 of a capacitor 40' comprises a plurality of micelles 1 and is adjacent to an electrolyte 31. Both the dielectric 30 and the electrolyte 31 are sandwiched between electrodes 32, 33. If other dimensions remain the same, then the thickness d of the dielectric layer in FIG. 3 is greater than the thickness d of the dielectric layer in FIG. 4, because the electrolyte 31 fills the thickness a.

Figure 5:
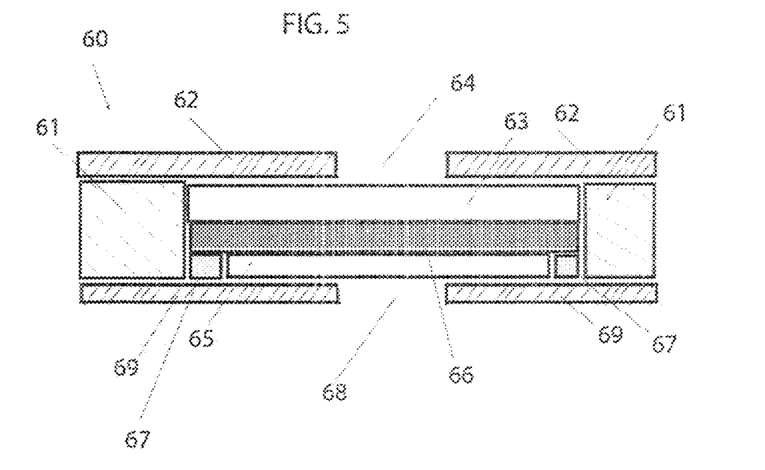
FIG. 5 illustrates construction of another example of a capacitor comprising a dielectric layer comprising ionomeric micelles.
Figure 6:
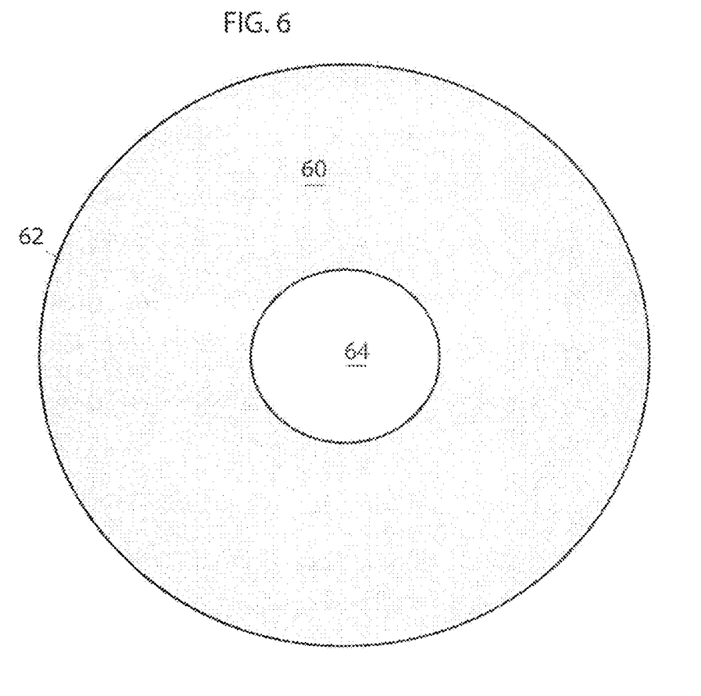
FIG. 6 illustrates a top plan view of the capacitor of FIG. 5.

Another example of a capacitor 60 is shown in FIGS. 5 and 6. FIG. 5 is a partially exploded view of the assembly. For example, a first layer 62, of a polymer, such as a polyethylene terephalate, a dielectric material with isolated, ionomeric domains, or another polymer, is adhered to a first spacer 61, such as an annulus, made of a non-conductive material. For example, the non-conductive material may be of the same material as the first layer. The first layer 62 may be adhered to a first electrode 63, such as an anode or a cathode, and a hole or void 64 may be provided in the first layer 62 for making electrical contact with the electrode 63. The electrode 63 may make electrical contact with a first side of a dielectric layer 66, the dielectric layer 66 comprising isolated, ionomeric micelles. A second electrode 65 may make electrical contact with an opposite side of the dielectric layer 66. A non-conductive filler or second spacer 67 may be used to fill a gap between the second electrode 65 and the first spacer 61. A second layer 69 is disposed opposite of the first layer 62 and adheres to the first spacer 61, the second spacer 67 and the second electrode 65. For example, the second layer, the filler and the first spacer may be made of the same materials as the first layer. In FIG. 6, an annular geometry is shown for the first layer 62 of the capacitor 60. The contact area 64 is shown as a circular hole in the annular first layer 62. For example, the first and second layers 62, 69 may be made of a self-adhesive, polyethylene terephalate (PET) film. The first and second electrodes 63, 65 may be made of an aluminum, such as a 1 mil or about 25 microns thick aluminum sheet. The dielectric layer 66 may comprise a multi-block co-polymer comprising isolated, ionomeric domains. For example, the first electrode may be a disk having a diameter of 8 centimeters, and the second electrode may be a disk having a diameter of 7 centimeters. The dielectric layer may be deposited on one or both of the electrodes in a thickness in a range from 20 to 100 microns. In one example, the thickness of the dielectric is in a range from 35 microns to 70 microns.

For example, a pentablock co-polymer may be comprised of a t-butyl styrene block coupled to an isoprene block coupled to a styrene block coupled to an isoprene block coupled to a t-butyl sytrene block. For example, each block may comprise a molecular weight of at least 10,000. In one example, the styrene block is sulfonated. For example, the sulfonation of the styrene block may be 15% to 100% mole sulfonated. More preferably, sulfonation is limited to a range having adequate sulfonation to create a large number of ionomeric micellular domains, such as an IEC of at least 0.5 mequiv/g, more preferably at least 0.8 mequiv/g, even more preferably at least 1 mequiv/g. However, some block co-polymers may form interconnected, non-isolated domains with too much sulfonation (or amination). Without being limiting in any way, isolated, ionomeric, micellular domains are thought to be required to achieve adequate dielectric properties of the dielectric layer for use in micelle capacitors.

In one example, the styrene block is sulfonated in a range from 15% to 25%, more preferably 25% to 35% or greater. At 15% to 25% a high power density and high energy density is achievable due to a surprising and unexpected dielectric constant of 4,300,000 and high break down voltage. In one example, a dielectric, micellular matrix provided a specific power of $7.947 \times 10^7$ W/kg and a specific energy of $6.622 \times 10^4$ Wh/kg at a maximum voltage achieved during testing (e.g. 6500 volts). Using an operating voltage of 2000 volts, which much is less than the breakdown voltage of the sample tested, a specific energy of $6.27 \times 10^3$ Jh/kg and a specific power of $7.52 \times 10^6$ W/kg may be achieved. These results are very surprising and unexpected, and provide for the use of the dielectric material in a region labelled "micelle" in FIG. 2, for example, which is well beyond what known ultracapacitors can do and may be capable of operating at energy densities greater than those provided by fuel cells, for example. There are many application for such a dielectric material including use in capacitors, electronic shielding and insulators. These surprising and unexpected results make new applications possible that could never have been attempted with traditional dielectric materials.

Figure 8:
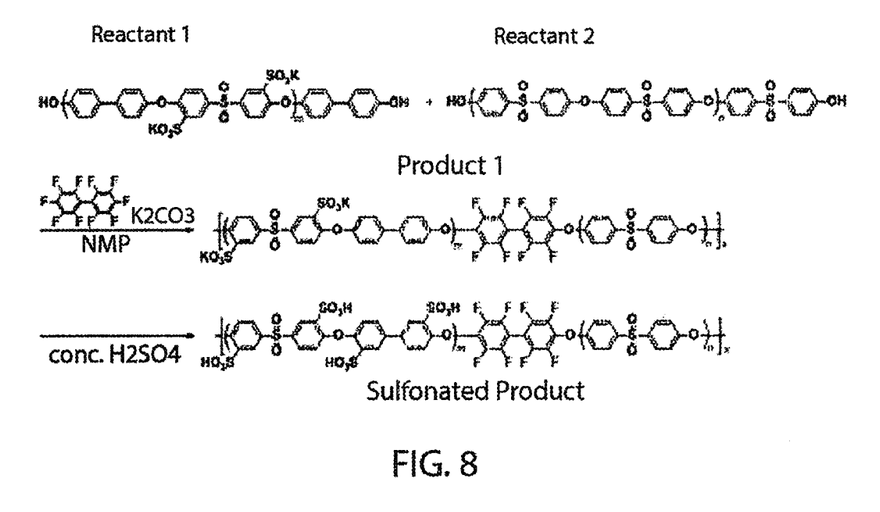
FIG. 8 illustrates an example of a chemical reaction for making a sulfone.

In another example, the dielectric matrix comprises sulfones, such as a sulfonated, multiblock copoly(ether sulfone). For example, as illustrated in the chemical reaction of FIG. 8, a sulfonated multiblock copolymer sulfone may be provided by combining a NMP solution of a first Reactant (Reactant 1) and a second reactant (Reactant 2) with decafluorobiphenyl (DFB) and K2CO3 and stirring at a reaction temperature, such as 120 C until the reaction is substantially completed, such as 18 hours, under a nitrogen atmosphere. The product (Product 1) may be poured into acetone to precipitate the polymer, and the polymer may be washed with water and dried. Product 1 may be mixed with concentrated sulfuric acid at a sulfonation temperature, such as 45 C, until sulfonated to the degree desired, such as up to about 6 hours, under a nitrogen atmosphere. The sulfonated product may be poured into water to precipitate a sulfonated polymer. Then, the sulfonated polymer may be washed with water several times and dried. The sulfonated product may be solubilized in a solvent and may be cast, drawn, deposited, sprayed, spin cast or otherwise deposited in a layer on an electrode, such that the layer becomes a dielectric matrix including micellular domains between the electrodes of a capacitor, such as disclosed elsewhere in this description.

Figure 9:
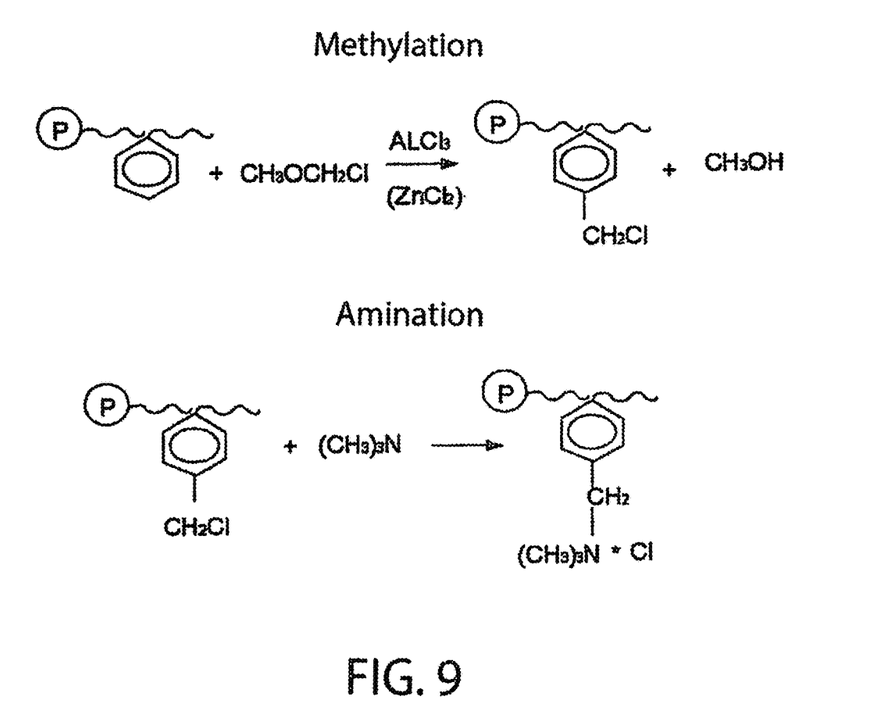
FIG. 9 illustrates an example for a process for aminating an ionomeric polymer.
Figure 10:
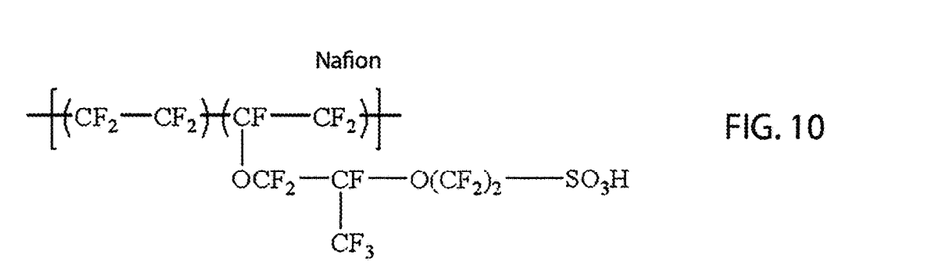
FIGS. 10-16 illustrate some examples of sulfonated and/or aminated polymers that may be capable of forming isolated, ionomeric micellular domains within a dielectric matrix.
Figure 11:
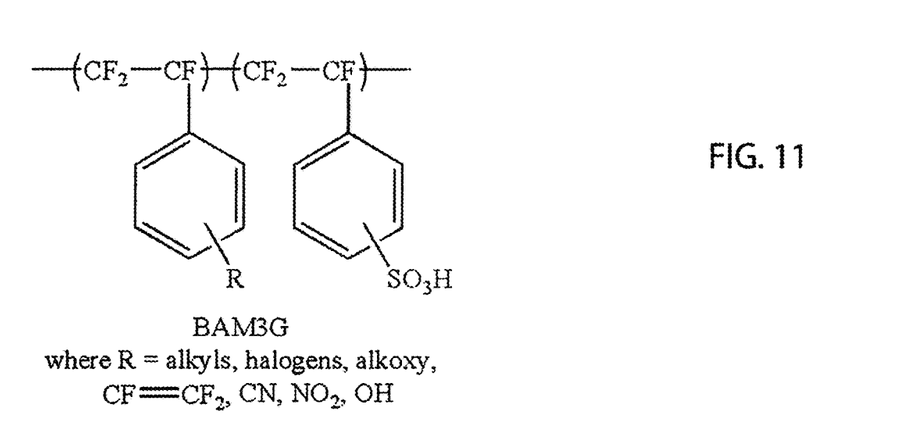
Figure 12:
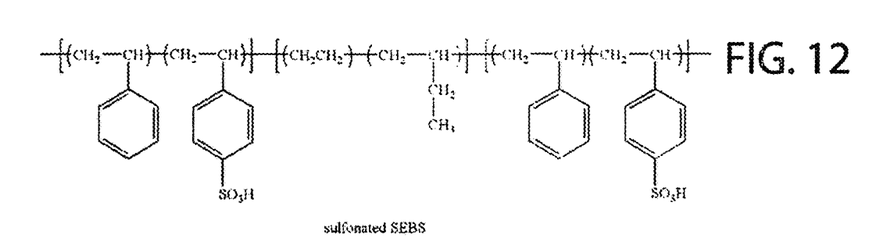
Figure 13:
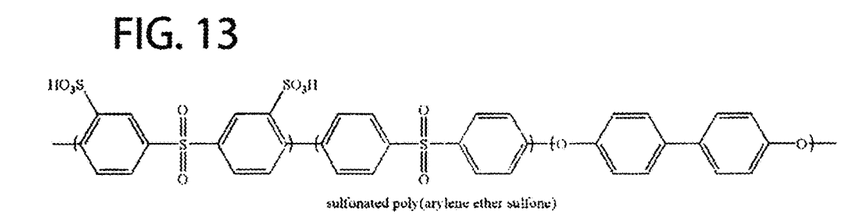
Figure 14:
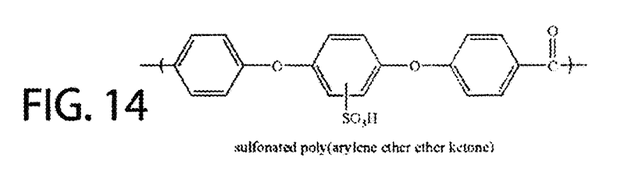
Figure 15:
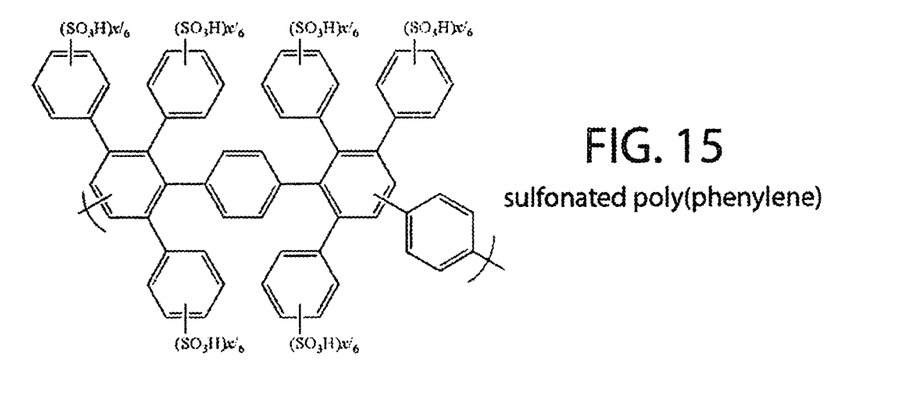
Figure 16:
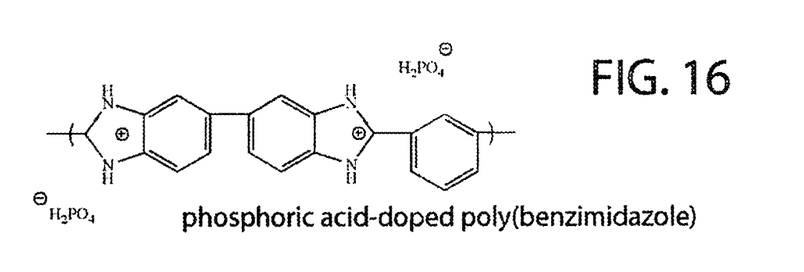

In one example, a copolymer is sulfonated or aminated, or both sulfonated and aminated, to a degree necessary to provide a large number of isolated, micellular domains exhibiting ionomeric properties. The copolymer may be precipitated and washed, if necessary, to remove impurities. Then, the copolymer may be dissolved in a compatible solvent, such as a cyclohexane, cyclohexane/heptane, toluene or toluene/propanol, the amount of solvent and type of solvent being chosen to provide for the viscosity and self-assembly of isolated, ionomeric micelles within a matrix, such that a dielectric matrix is formed. FIG. 9 illustrates a process for aminating an ionomeric polymer, for example. FIGS. 10-16 illustrate some examples of sulfonated and/or aminated polymers that may be capable of forming isolated, ionomeric micellular domains within a dielectric matrix.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A dielectric comprising a dielectric micellular matrix comprised of a plurality of ionomeric micelles distributed within a matrix, such that each of the plurality of micelles comprises an electrically isolated, ionomeric domain isolated from the remainder of the plurality of micelles.

2. The dielectric of claim 1, wherein the matrix comprises a polymer.

3. The dielectric of claim 2, wherein the polymer comprises a block co-polymer.

4. The dielectric of claim 3, wherein block co-polymer comprises at least one styrene block.

5. The dielectric of claim 4, wherein the at least one styrene block is at least partially sulfonated.

6. The dielectric of claim 5, wherein the block co-polymer comprises at least one non-ionic block.

7. The dielectric of claim 3, wherein the block co-polymer comprises a multi-block polymer comprising at least three blocks, each of the three blocks comprising a different polymer, and the at least three blocks comprises at least one ionic block and at least one non-ionic block.

8. The dielectric of claim 7, wherein at least one of the at least three blocks is a non-ionic block engineered to impart at least a range of miscibility of the polymer in a solvent.

9. The dielectric of claim 8, wherein at least one of the blocks is a non-ionic block selected to bind at least two of the at least three blocks together.

10. A capacitor comprising:
an anode;
a cathode; and
a layer of a dielectric, the dielectric comprising a dielectric micellular matrix comprised of a plurality of ionomeric micelles distributed within a matrix, such that each of the plurality of micelles comprises an electrically isolated, ionomeric domain isolated from the remainder of the plurality of micelles, the layer physically separating the anode from the cathode.

11. The capacitor of claim 10, wherein the anode is aluminum.

12. The capacitor of claim 11, wherein the cathode is aluminum.

13. The capacitor of claim 10, wherein the layer of dielectric is at least 35 microns in thickness.

14. The capacitor of claim 10, wherein the layer of dielectric is at least 70 microns in thickness.

15. The capacitor of claim 10, wherein a first polymer sheet encapsulates at least a portion of the anode, and a second polymer sheet encapsulates at least a portion of the cathode, and the first sheet and the second sheet adhere one to the other, such that the dielectric layer is sealed within the capacitor, and the anode is electrically isolated from the cathode.

16. The capacitor of claim 15, wherein the polymer sheet comprises a film of polyethylene terephthalate.

17. A method for manufacturing a capacitor of claim 10, comprising:
dissolving a multi-block co-polymer in a solvent to form a solution;
disposing the solution as a layer on a surface of one or both of an anode and a cathode;
removing the solvent from the solution, leaving the layer on the surface of one or both of the anode and the cathode;
positioning the cathode on the anode, such that the layer is disposed between the cathode and the anode, and a portion of the layer extends beyond the outer perimeter of either of the cathode or the anode; and
applying pressure such that the anode and the cathode make electrical contact with the layer; and
forming a plurality of ionomeric polymer micelles distributed within a matrix, such that each of the plurality of micelles comprises an isolated, ionic domain segregated from the remainder of the plurality of micelles.

18. The method of claim 17, wherein the step of forming occurs by self-assembly of the plurality of micelles.

19. A method of using the capacitor of claim 10, comprising:
connecting the capacitor of claim 10 to charging electronics and discharging electronics;
charging the capacitor of claim 10 to at least 100 volts and at least one Coulomb;
at least partially discharging the capacitor; and
repeating the steps of charging and discharging at least 100 times.

20. The method of claim 19, further comprising:
stacking at least two of the capacitors of claim 10; and
electrically coupling the at least two of the capacitors of claim 10 in parallel.

* * * * *